Sept. 29, 1925. 1,555,476
V. V. MESSER
CANE STRIPPER
Filed Dec. 17, 1924

WITNESSES
INVENTOR
Vladimir V. Messer
BY
Knight Bro.
ATTORNEYS

Patented Sept. 29, 1925.

1,555,476

UNITED STATES PATENT OFFICE.

VLADIMIR V. MESSER, OF DOUGLASTON, NEW YORK.

CANE STRIPPER.

Application filed December 17, 1924. Serial No. 756,478.

*To all whom it may concern:*

Be it known that I, VLADIMIR V. MESSER, a citizen of the United States, and a resident of Douglaston, Long Island, county of Queens, State of New York, have invented certain new and useful Improvements in Cane Strippers, of which the following is a specification.

The object of this invention is to produce a hand implement that will enable an operator to strip the leaves from a stalk, for example, the stalk of a sugar cane plant. As is well known, the man engaged in cutting cane must in general first remove the leaves from the stalk before cutting the latter with a swing of his machete. This he may do with several skillfully directed slicing motions of his machete, but this takes some time and as the machete is a heavy knife, there is no small consumption of energy both of which detract materially from the efficiency of the operator.

My present invention comprises an implement having handles designed to fit over the hand not engaged in the cutting; the said handles having stripping blades projecting downwardly therefrom and adapted to closely engage the stalk so that by a combined grasping and downward motion the operator may strip all the leaves at once cleanly from the stalk. The stripping implement comprises also a hinged joint connecting two halves of the tool in such a way that the opening and closing of the hand will open and close the tool to enable the operator to apply the tool to the stalk, the hinge permitting the stripping tool to accommodate itself to the stalk and also enabling the operator to use his hand as usual to grasp a bundle of stalks, this being particularly practicable because the thumb of the tool-holding hand is left free to function and is not in any way restricted in its movements.

The invention is illustrated in the accompanying drawings, in which

Figure 1:
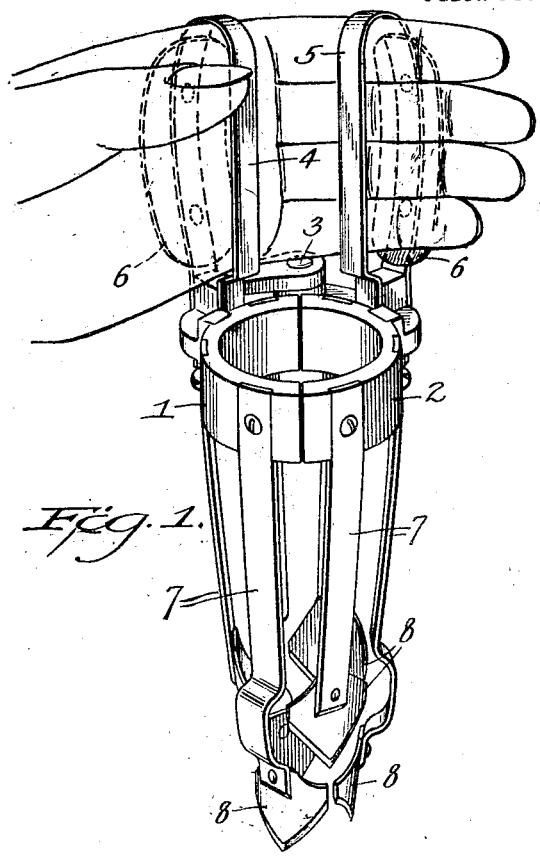
Figure 1 is a front elevation of the implement in its closed position.
Figure 2:
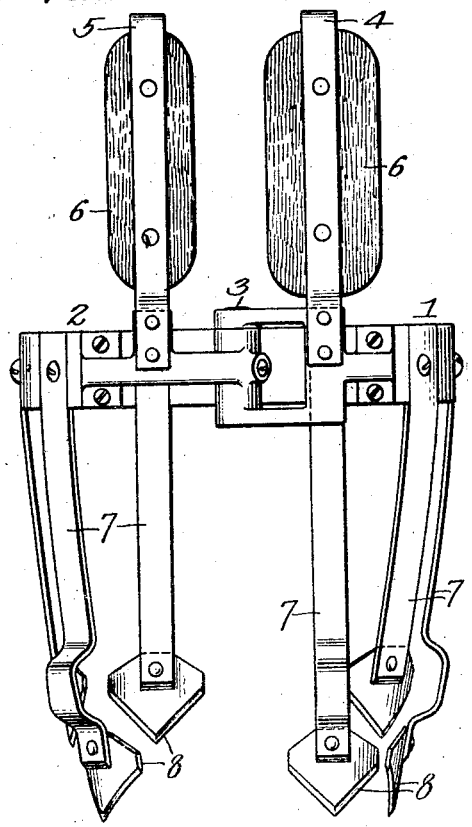
Figure 2 is a rear view of the same in its open position.
Figure 3:
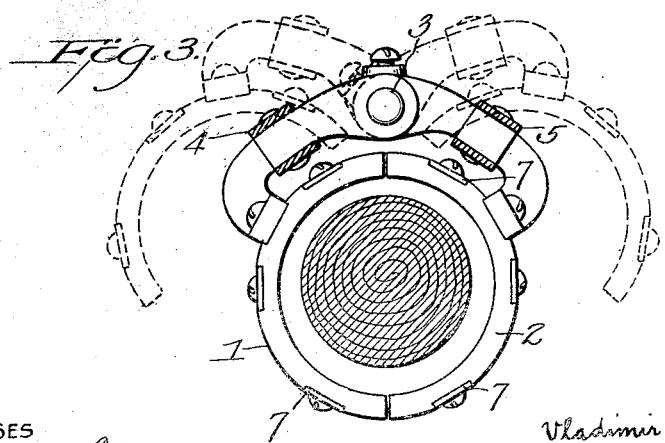
Figure 3 is a view transverse to the axis partially in section.

The implement comprises two members 1 and 2, connected together by a hinge 3. These members are made semi-cylindrical in shape so as to be able to embrace fairly snugly the stalk of a sugar cane plant. Each member has a handle portion 4 and 5, one being adapted to fit over the palm portion of the hand and the other to fit over the fore-fingers of the same hand, as shown in the drawing, the thumb being left free. The folding motion of the fingers toward the palm portion of the hand will, therefore, result in closing the members 1 and 2 together so that they may be made to embrace the stalk as aforesaid. The handles 4 and 5 are preferably provided with leather or other suitable pads 6 for the protection of the back of the hand from chafing. Extending from the members 1 and 2 on the side opposite from the handles are blades 7. These blades are preferably made flexible and are bent inward so that they will engage even the smaller stalks snugly. They have laterally extended heads shown at 8, so that the cutting edges overlap each other, with the result that the stalk is completely surrounded by cutting knives. The blades being flexible will spread apart when applied to a thicker stalk so that stalks of various diameters will be embraced by the blades with equal snugness, the implement being applied to the hand of an operator which will be the hand not engaged in cutting the stalk. The operator, with the implement in its open position, places it against the stalk and closes his hand, moving the fingers toward the palm, bringing the members 1 and 2 together around the stalk and then with a quick, downward motion, thrusts the blades 7 between the stalk and leaves, stripping all the leaves from the stalk in a clean and thorough manner. The operator then may open his hand, thereby opening the implement, and with his other hand cut the stalk from the ground at the lower end of the stripped portion of the stalk, or he may continue to hold the stalk with his left hand by means of the implement, raising the implement up again for that purpose while he cuts the stalk, and with his free thumb of the implement-holding hand, together with the implement and his hand, grasp the stalk to dispose of it in any desired manner.

It will be understood that any equivalent of the hinge 3 may be used and that the invention is not limited to the specific form of blades or other parts of the implement as shown, as various modifications of the elements of the tool may be made without departing from the scope of the invention.

I claim:—

1. A cane stripper comprising two handles, one handle adapted to fit over the fingers and the other handle adapted to fit over the palm portion of the hand, each handle having a separate stripping blade connected therewith.

2. A cane stripper comprising two handles, one handle adapted to fit over the fingers and the other handle adapted to fit over the palm portion of the hand, each handle having a separate set of stripping blades connected therewith, and a flexible connection between the two handles.

3. A cane stripper comprising two members joined by a hinge, each member having a portion adapted to fit the hand and a blade portion adapted to fit a stalk.

4. A cane stripper comprising two members with a hinge connection between them, one member having a handle adapted to fit over the palm portion of the hand and the other member having a handle adapted to fit over the fingers, both members having stripping blades extending therefrom.

5. A cane stripper comprising two members with a hinge connection between them, one member having a handle adapted to fit over the palm portion of the hand and the other member having a handle adapted to fit over the fingers, both members having stripping blades extending therefrom in a direction parallel to the handles.

6. A cane stripper comprising two members with a hinge connection between them, one member having a handle adapted to fit over the palm portion of the hand and the other member having a handle adapted to fit over the fingers, both members having stripping blades extending therefrom in a direction parallel to the handles, the said blades being curved to the section of a cylinder whereby they are adapted to surround the stalk of the plant to be stripped.

7. A cane stripper comprising two members hinged together, each member having a portion adapted to fit over the hand, and flexible stripping blades extending in cylindrical form therefrom.

8. A cane stripper comprising two members hinged together, each member having a portion adapted to fit over the hand, and a plurality of overlapping, flexible stripping blades extending in cylindrical form therefrom.

9. A cane stripper comprising two semi-cylindrical members hinged together, each member having a portion adapted to fit over the hand, and flexible stripping blades extending in cylindrical form therefrom.

VLADIMIR V. MESSER.